UNITED STATES PATENT OFFICE.

ADNA D. WARNER, OF MISHAWAKA, INDIANA, AND RAYMOND B. PRICE, OF NEW YORK, N. Y., ASSIGNORS TO RUBBER REGENERATING COMPANY, A CORPORATION OF INDIANA.

PROCESS OF VULCANIZING RUBBER.

1,163,050.     Specification of Letters Patent.     Patented Dec. 7, 1915.

No Drawing.     Application filed January 30, 1913. Serial No. 745,190.

*To all whom it may concern:*

Be it known that we, ADNA D. WARNER and RAYMOND B. PRICE, citizens of the United States, residing, respectively, at Mishawaka, county of St. Joseph, State of Indiana, and the borough of Manhattan, city of New York, State of New York, have invented new and useful Improvements in Processes of Vulcanizing Rubber, of which the following is a specification.

Our invention relates to the vulcanization of rubber and the like, and has for its object to provide an improved process of vulcanizing the same whereby a better product will be produced.

In carrying out our process the stock to be treated is first subjected to a heating process, which may be varied at will, the same being either at approximately atmospheric pressure, or, if desired, under a vacuum. This is continued for a period, the temperature remaining during this period below the vulcanizing temperature. The material is then subjected to a pressure which may be varied as desired, and the heating operation continued until a temperature sufficient for the desired vulcanization is attained. Thus, in treating rubber boots the minor heating step in the process occupies about one hour, and the higher or vulcanizing temperature is applied for approximately four hours. A partial vacuum and a temperature below 212° F., varying with the nature of the stock, have produced good results in the minor heating step. Furthermore, a pressure of approximately twenty five pounds, and a final temperature of approximately 265° F., have produced good results when compressed air is used. But we do not limit ourselves to air, as other pressure and heat transmitting means may be employed.

Having thus described our invention, what we claim as new and desire to secure by Letters Patent is:

1. The process of vulcanizing rubber or the like, which comprises first subjecting the material to a heating process at a temperature below the vulcanizing temperature for a definite period of time, and then while the material is in its heated condition, subjecting it to an increased pressure for compacting the same, and then increasing the temperature to a point to produce the desired vulcanization.

2. The process of vulcanizing rubber or the like, which comprises first subjecting the material to a heating process at a temperature below 212° F. for a definite period of time, and then while the material is in heated condition, subjecting it to an increased pressure of approximately 25 lbs. for compacting the same, and then increasing the temperature to approximately 265° to produce the desired vulcanization.

ADNA D. WARNER.
RAYMOND B. PRICE.

Witnesses for Adna D. Warner:
    A. M. DISCH,
    A. M. MORNINGSTAR.

Witnesses for Raymond B. Price:
    EDWARD A. ANDERSEN,
    A. R. BOARDMAN.

Copies of this patent may be obtained for five cents each, by addressing the "Commissioner of Patents, Washington, D. C."